(12) United States Patent
Hechtfischer (10) Patent No.: US 10,309,607 B2
(45) Date of Patent: Jun. 4, 2019

(54) LIGHTING SYSTEM

(71) Applicant: KONINKLIJKE PHILIPS N.V., Eindhoven (NL)

(72) Inventor: Ulrich Hechtfischer, Aachen (DE)

(73) Assignee: Koninklijke Philips N.V., Eindhoven (NL)

(*) Notice: Subject to any disclaimer, the term of this patent is extended or adjusted under 35 U.S.C. 154(b) by 8 days.

(21) Appl. No.: 15/574,127

(22) PCT Filed: May 10, 2016

(86) PCT No.: PCT/EP2016/060387
§ 371 (c)(1),
(2) Date: Nov. 14, 2017

(87) PCT Pub. No.: WO2016/184717
PCT Pub. Date: Nov. 24, 2016

(65) Prior Publication Data
US 2018/0149327 A1    May 31, 2018

(30) Foreign Application Priority Data

May 18, 2015 (EP) .................................. 15167915

(51) Int. Cl.
*F21S 41/675* (2018.01)
*G02B 26/08* (2006.01)
(Continued)

(52) U.S. Cl.
CPC ............ *F21S 41/675* (2018.01); *F21S 41/14* (2018.01); *F21S 41/16* (2018.01); *F21S 41/176* (2018.01);
(Continued)

(58) Field of Classification Search
CPC ...... F21S 41/675; F21S 41/176; F21S 41/365; F21S 41/14; F21S 41/16; F21S 41/36;
(Continued)

(56) References Cited

U.S. PATENT DOCUMENTS 9,702,519 B2    7/2017  Reiners
9,772,084 B2    9/2017  Saito
(Continued)

FOREIGN PATENT DOCUMENTS

DE    102010028949 A1    11/2011
EP         2581648 A1     4/2013
(Continued)

OTHER PUBLICATIONS

EPO as ISA, "International Search Report and Written Opinion" dated Aug. 5, 2016 from International Application No. PCT/EP2016/060387, filed May 10, 2016, 14 pages.
(Continued)

*Primary Examiner* — Elmito Breval
*Assistant Examiner* — Hana S Featherly
(74) *Attorney, Agent, or Firm* — Patent Law Group LLP; Brian D. Ogonowsky (57) ABSTRACT

A lighting system includes a light source such as a laser, a scanning system such as a micro-mechanical mirror, and a converter element such as a phosphor. A redirection element is arranged in the optical path and has a discontinuity so that light is redirected to spaced apart locations on the converter element from adjacent locations on either side of the discontinuity. The redirection element increases the light's angular range. The lighting system may have a lens to project a desired pattern of light on the converter element forwards. A controller may control the scanning system to
(Continued)

produce the desired pattern of light. The lighting system may adapt the pattern of light. The lighting system may be used in automotive applications.

15 Claims, 7 Drawing Sheets

(51) Int. Cl.
| | |
|---|---|
| *G02B 26/10* | (2006.01) |
| *G02B 27/09* | (2006.01) |
| *F21S 41/14* | (2018.01) |
| *F21S 41/20* | (2018.01) |
| *F21S 41/36* | (2018.01) |
| *F21S 41/16* | (2018.01) |
| *F21S 41/365* | (2018.01) |
| *F21S 41/176* | (2018.01) |

(52) U.S. Cl.
CPC ............ *F21S 41/285* (2018.01); *F21S 41/36* (2018.01); *F21S 41/365* (2018.01); *G02B 26/0833* (2013.01); *G02B 26/105* (2013.01); *G02B 27/0927* (2013.01); *G02B 27/0972* (2013.01); *G02B 27/0977* (2013.01); *G02B 27/0983* (2013.01)

(58) Field of Classification Search
CPC . F21S 41/285; G02B 26/0833; G02B 26/105; G02B 27/0927; G02B 27/0972; G02B 27/0977; G02B 27/0983
See application file for complete search history.

(56) References Cited

U.S. PATENT DOCUMENTS

| | | |
|---|---|---|
| 2006/0285078 A1 | 12/2006 | Kasazumi et al. |
| 2014/0362600 A1* | 12/2014 | Suckling ............... F21S 41/663 362/583 |

FOREIGN PATENT DOCUMENTS

| | | |
|---|---|---|
| JP | H03113411 A | 5/1991 |
| WO | 2010010773 A1 | 1/2010 |
| WO | 2015146309 A1 | 10/2015 |
| WO | 2016061599 A1 | 4/2016 |
| WO | 2016087076 A1 | 6/2016 |

OTHER PUBLICATIONS

Extended European Search Report dated Nov. 19, 2015 from European Patent Application No. 15167915.6 filed May 18, 2015, 6 pages.

\* cited by examiner

Fig. 13

LIGHTING SYSTEM

CROSS-REFERENCE TO RELATED APPLICATIONS

The present application is a § 371 application of International Application No. PCT/EP2016/060387 filed on May 10, 2016 and titled "LIGHTING SYSTEM," which claims the benefit of European Patent Application No. 15167915.6 filed on May 18, 2015. International Application No. PCT/EP2016/060387 and European Patent Application No. 15167915.6 are incorporated herein.

FIELD OF THE INVENTION

The invention relates to a lighting system capable of generating a desired lighting pattern.

EP2581648A1 alleviates the distance problem by directly scanning the laser over the illumination area without any intermediate phosphor but in that loses the advantages of color conversion provided by the phosphor. Furthermore, by using a stationary reflecting member, EP2581648A1 maps the lower scanning range to the upper one thereby doubling the vertical scanning frequency and improving the vertical illuminance distribution.

BACKGROUND OF THE INVENTION

There is an increasing desire for a lighting system that can be controlled, i.e. for which the emitted lighting pattern can be changed dynamically or can be selected according to need.

A particular application for such a lighting system is in automotive headlights. For example, it may be desirable in a first state for the automotive headlight to have a high beam pattern but omitting a section to avoid illuminating an oncoming vehicle to avoid glare. Alternatively, there may be a desire to adapt the direction of illumination for example to illuminate road signs, curves in the road, obstacles or other features.

There are a number of different approaches to realising dynamic adaptation of lighting, including for example switchable mechanical apertures, LED matrix lights, microdisplays, or laser scanners.

In one laser scanner approach, a laser beam is used to illuminate a micromirror which directs the laser beam onto a phosphor acting as a converter. The converter may be used to convert light of one wavelength, for example blue, to another wavelength or spread of wavelengths to generate suitable colours. A lens may then be used to project the light onto the road. By moving the micromirror, a range of patterns can be produced.

However, a problem that occurs is that the range of motion of the micromirror is restricted. This can make it difficult to generate some desired patterns. Also, the restricted range of motion of the micromirror results in the need for a large distance between micromirror and phosphor, but this makes the optical design more difficult.

SUMMARY OF THE INVENTION

The invention is defined by the claims.

According to examples in accordance with an aspect of the invention, there is provided a lighting system comprising:

a light source, for emitting first light;
a converter element, configured to receive the first light and emit second light;
an optical path between the light source and the converter element;
a scanning system, arranged in the optical path and configured to direct the first light in a plurality of directions; and
a redirection element, arranged in the optical path between the scanning system and the converter element, the redirection element having a discontinuity;
wherein the redirection element is arranged to direct the first light to spaced apart locations on the converter element from adjacent locations on either side of the discontinuity.

The scanning system redirects the first light from the light source to a range of directions incident on the redirection element.

The redirection element is configured to receive light from the scanning system and redirect it toward the converter element. By using a redirection element with a discontinuity it is possible to increase the effective range of scanning patterns that can be produced with a given scanning system, since as the scanning system directs the light past the discontinuity there is a step change in the location at which the first light is incident onto the converter element. This may make possible scanning patterns that would have been physically difficult (or even impossible) to produce, or may make possible scanning patterns that would previously have required a more complex or expensive scanning system to produce.

The redirection element has a first section and a second section, the discontinuity being between the first and second sections; the first section being arranged to redirect first light onto a first portion of the converter element; the second section being arranged to redirect first light onto a different second portion of the converter element.

In this way, the desired light pattern on the converter element may be mapped to appropriate or convenient regions of the redirection element depending on the light pattern generated by the scanning system.

At least one of the said spaced apart locations on the converter element is an outer edge of the resulting light distribution on the converter element.

By arranging for light at the discontinuity to be directed to the outer edges of the first and second portions, i.e. the outer edges of the light distribution on the converter element, a central low intensity region generated by a sinusoidal motion of the scanning system may correspond to the outer edges of the light distribution and hence the light distribution may have lower intensity outer edges and higher intensity towards the centre of the light distribution.

The redirection element may be a reflector, having first and second sections having an angular discontinuity between the first and second sections. The first and second sections may be planar. Such a redirection element is relatively simple to manufacture and adjust.

Alternatively, the redirection element may be a prism, having first and second sections with the discontinuity between the first and second sections. The prism may be arranged to refract first light incident on the first section towards a first portion of the converter element and first light incident on the second section in a different direction towards a second portion of the converter element.

The redirection element may have at least three sections each directing the first light onto a respective portion of the converter element. This allows for more complex light intensity patterns at the converter element to be achieved.

In another arrangement, the redirection element may be a reflector having an edge, the edge constituting the discontinuity. The first light incident on the redirection element is redirected by the redirection element towards a first portion of the converter element and first light on the other side of the discontinuity passes by the redirection element and is incident on the second portion of the converter element without redirection.

The lighting system may include a controller arranged to drive the scanning system in a predetermined pattern repeating with a repetition rate of at least 100 Hz to generate a predetermined intensity profile at the converter element. Preferably the repetition rate is at least 200 Hz. This moves the spot of light generated by the system sufficiently quickly that the eye perceives a continuous intensity profile at the converter element.

The scanning system may use a movable reflector. The movable reflector may be a micromechanical system including a mirror.

The lighting system may include a lens arranged to project light from the conversion element.

The light source may be a laser light source.

The light source may emit first light of a first colour. The conversion element may be a phosphor adapted to pass some first light of the first colour and to absorb some light of the first colour and emit the second light in a second colour, wherein the first and the second colours combine to give white.

The first colour, emitted by the light source, may be blue. The second colour may be yellow. The light source may be a blue laser.

In another aspect, the invention relates to an automotive headlamp comprising a lighting system as set out above.

BRIEF DESCRIPTION OF THE DRAWINGS

Examples of the invention will now be described in detail with reference to the accompanying drawings, in which.

The figures are schematic and not to scale.

DETAILED DESCRIPTION OF THE EMBODIMENTS

The invention provides an adaptive lighting system.

Figure 1:
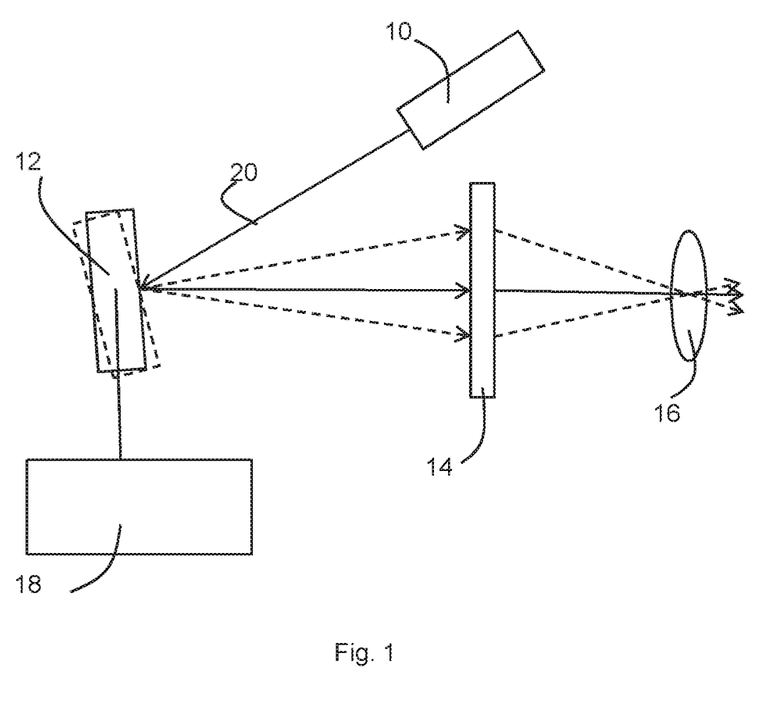
FIG. 1 shows an arrangement according to a comparative example.

FIG. 1 illustrates a comparative example with a laser light source 10, a micromirror 12, a phosphor screen 14 and a lens 16. The laser light source 10 is arranged to emit first light in the form of a light beam 20 onto a scanning element, here micromirror 12 which reflects the light onto a converter element, here a phosphor screen 14. The micromirror is a micromechanical mirror capable of directing incident light to a range of angles, for example +5° to −5°.

The scanning element 12 is movable under the control of control system 18 and hence can direct the laser light beam to project the resulting spot onto a variety of locations on phosphor screen 14. This can create a pattern of light intensity on the phosphor screen. By driving the scanning element quickly in a repeated motion, the motion may be sufficiently rapid that a user may simply see the resulting pattern of intensity. By adjusting the drive of the scanning element, a variety of suitable patterns can be generated, either dynamically or statically. The repetition rate may be 100 Hz, preferably 200 Hz.

The phosphor screen absorbs some of the first light and re-emits second light which is collected and projected by lens 16.

Figure 2:
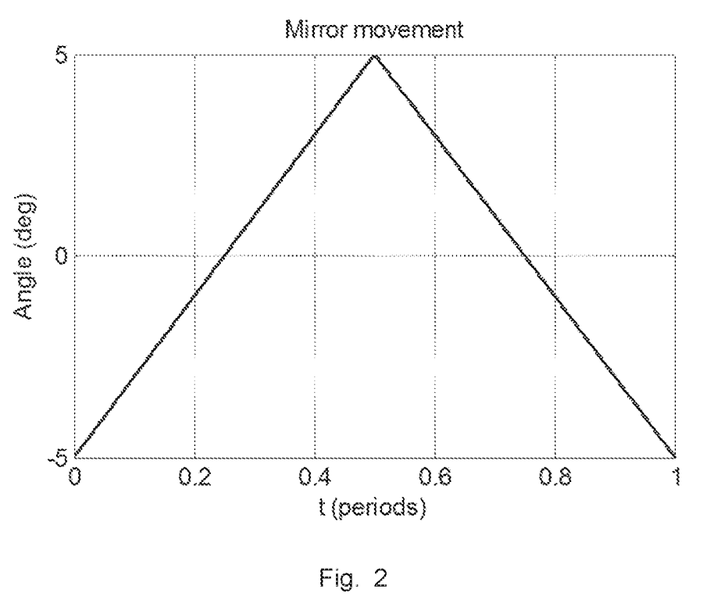
FIG. 2 shows a theoretical mirror motion pattern of the example of FIG. 1.
Figure 3:
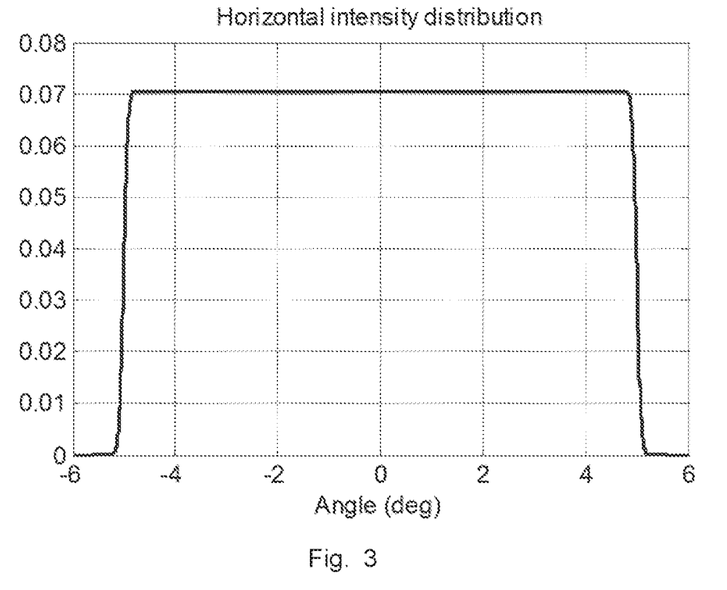
FIG. 3 shows the intensity profile resulting from the motion pattern of FIG. 2.

Consider for example the case that an even intensity distribution across the phosphor screen 14 is required. In theory, the mirror can be driven as illustrated in FIG. 2, which shows the mirror being driven between +5° and −5° linearly. This produces the time-averaged light intensity as a function of position horizontally across the screen illustrated in FIG. 3.

However, in practice this is not possible. A mechanical mirror has a finite moment of inertia and in practice it is not possible to generate the abrupt changes of direction proposed in FIG. 2, since such changes would require extreme torque to be applied to the mirror. The torque supplied by the micromirror actuators is limited. Abrupt changes in direction are possible if the movement is slow, but a slow movement is inappropriate.

Figure 4:
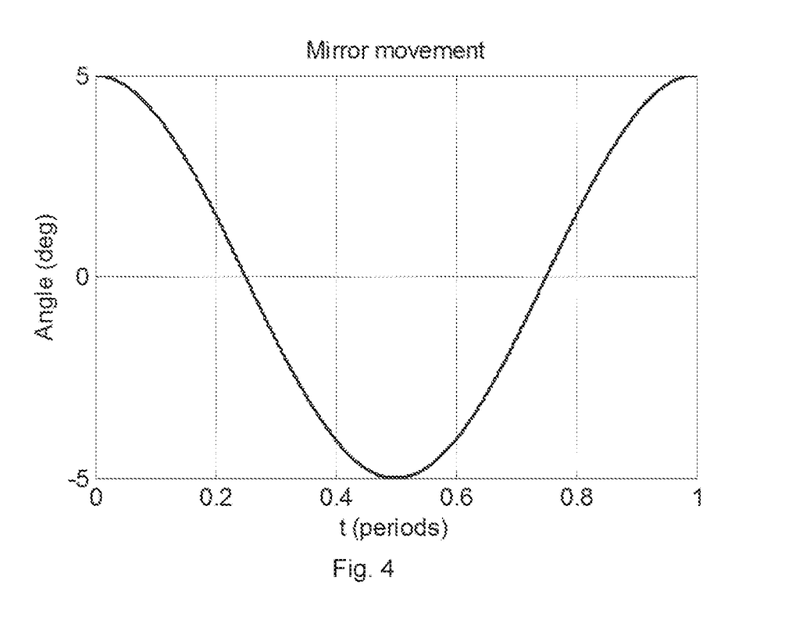
FIG. 4 shows a more realistic mirror motion pattern for the example of FIG. 1.
Figure 5:
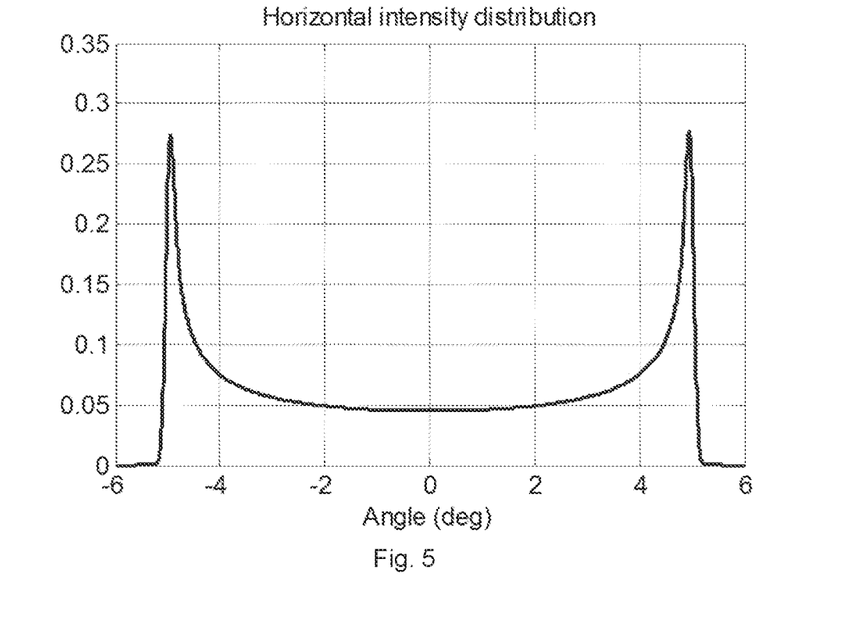
FIG. 5 shows the intensity profile resulting from the motion pattern of FIG. 4.

Thus, a real micromirror driven rapidly between +5° and −5° moves approximately harmonically, i.e. with a sine wave pattern having a direction as a function of time as illustrated in FIG. 4. This leads to a time-averaged light intensity as illustrated in FIG. 5. Note that the time-averaged light intensity has an inappropriate intensity distribution with two side peaks and a low central intensity.

For many applications, such an intensity distribution is unsuitable. This applies in particular, for example, to automotive applications but many applications require a central bright region.

It might be thought that it would be straightforward to drive the micromirror in a different pattern and hence achieve a different light intensity profile but this is not possible, because of the torque limitation, see above. The reason is that the motion of the mirror needs to be very rapid in order that the human eye does not detect the rapid motion of the mirror and instead simply sees a single light source of the required pattern.

Figure 6:
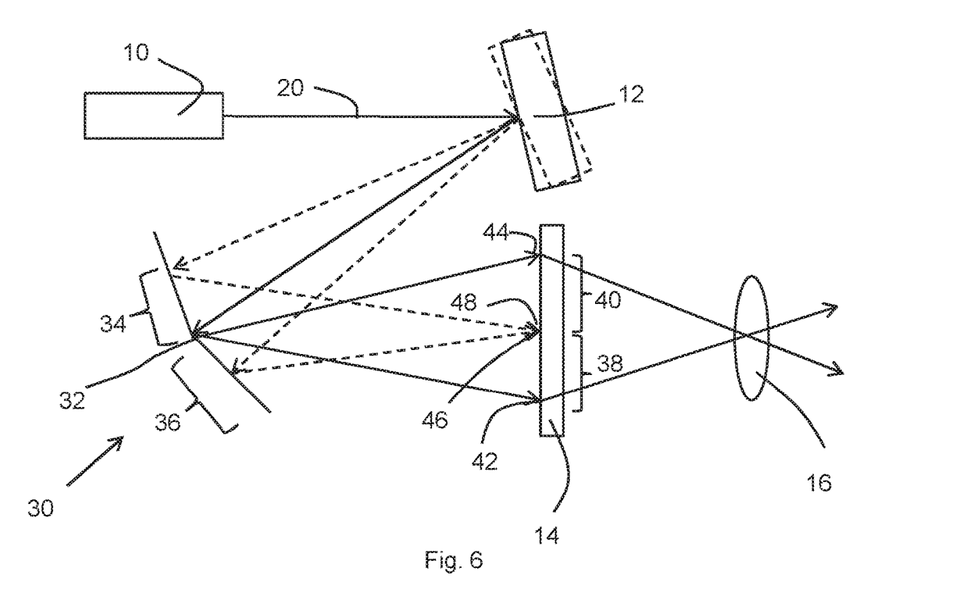
FIG. 6 shows an arrangement according to a first embodiment of the invention.

In the inventive embodiment illustrated in FIG. 6, a laser light source 10 directs a light beam 20 of first light onto micromirror 12 which in turn directs the first light onto redirection element 30. The redirection element 30 reflects the first light to create a spot on converter element 14. The converter element 14 converts some of the first light (e.g. blue) into second light (e.g. yellow) and lens 16 projects the resulting light 38, 40 forwards. As the micromirror moves, the resulting spot positions over time integrate to give a resulting light distribution 38, 40.

In this case redirection element 30 is a fixed mirror with a first plane section 34 and a second plane section 36 with a discontinuity 32 between the plane elements 34, 36. This configuration may be referred to as a "buckled mirror" configuration.

Light incident on the first plane section 34 is directed to a first region 38 of the converter element 14 and light incident on the second plane section 36 is directed to a second region 40 of the converter element 14. The first and second regions 38, 40 together make up a resulting light distribution 38, 40. Note that the light distribution 38, 40 does not need to extend to the edge of the converter element 14.

Light close to the discontinuity 32 on the first plane section 34 is directed to form a spot at the outer edge 42 of the first region 38 and light close to the discontinuity on the second plane section 36 is directed to form a spot at the outer edge 44 of the second region 40. Light from the extreme position of the light beam 20 incident on first plane section 34 is redirected to inner edge 46 of the first region 38 and light from the extreme position of the light beam 20 incident on the second plane section 36 is redirected to inner edge 48 of the second region 40. Note that inner edges 46, 48 are approximately coincident.

Figure 7:
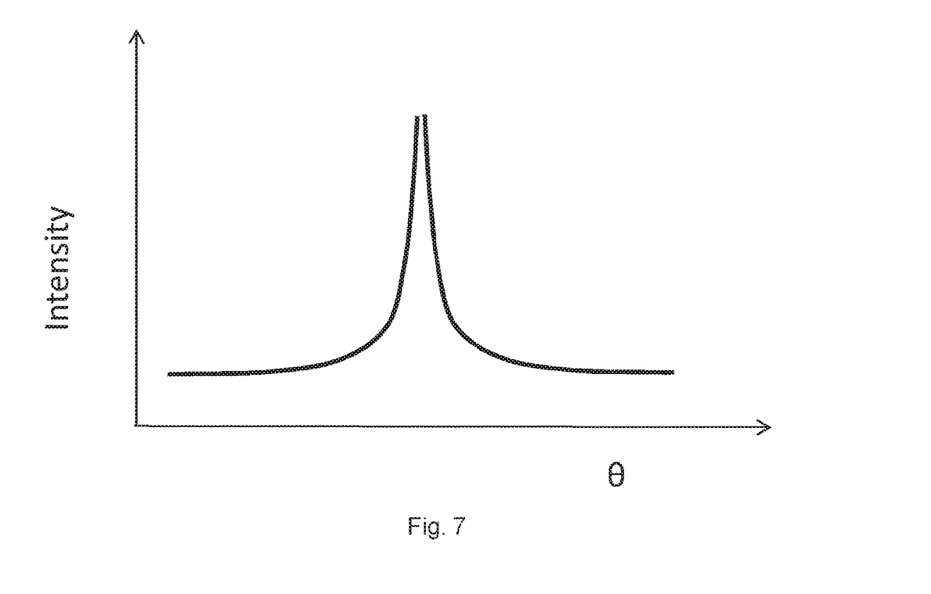
FIG. 7 shows the intensity profile resulting from the arrangement of FIG. 6.

The micromirror rotates rapidly in the centre of the motion of the micromirror 12 and relatively slowly towards the edges of the motion of the micromirror as the micromirror 12 is driven in a sinusoidal motion. The resulting intensity distribution across the converter element 14 is as illustrated in FIG. 7. By mapping the extreme edges of the motion of the micromirror to the centre of the light distribution 38, 40 and the centre of the motion of the micromirror to the extreme edges of the light distribution the light intensity pattern on the converter element 14 has a high intensity at the centre and a low intensity towards the edges. This is a light intensity pattern that is much more suitable in many applications than that illustrated in FIG. 5.

The laser 10 generates blue light as first light and the converter element 14 may be a phosphor that converts incident blue light into yellow light as second light. When the yellow light combines with unconverted blue light, the resulting light is white. Thus, the light collected by lens 16 and projected forwards may be white light.

The lighting system of FIG. 6 may in particular be an automotive headlight in which lens 16 is in the headlamp of the motor vehicle to project the light forwards to the road. In such an application, there may be a number of drive patterns controlled by controller 18 such as main beam (high beam), dipped headlights, parking lights (low intensity) and adaptive patterns in different directions for example to direct light around curves, to signs, or towards obstacles.

Lasers that generate blue light are known. Alternatively, other light sources such as light emitting diodes may also be used. Phosphors that convert blue light into yellow light are also known to those skilled in the art.

Other colours of first light and second light are possible where required or useful, depending on the desired colour of the output.

Other configurations of redirection element 30 are possible.

Figure 8:
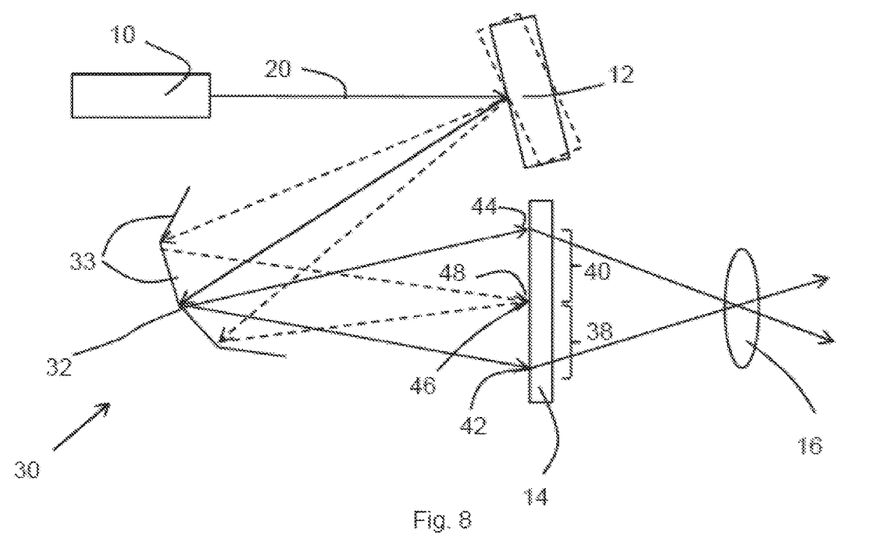
FIG. 8 shows an arrangement according to a second embodiment of the invention.

The redirection element may have more than two sections. FIG. 8 illustrates an example with a redirection element having four sections 33.

In FIG. 8 the four sections 33 are arranged linearly one after the other. It is also possible for the multiple sections 33 to be arranged in two dimensions for example a mirror with four sections arranged in a 2 by 2 array (not shown).

Figure 9:
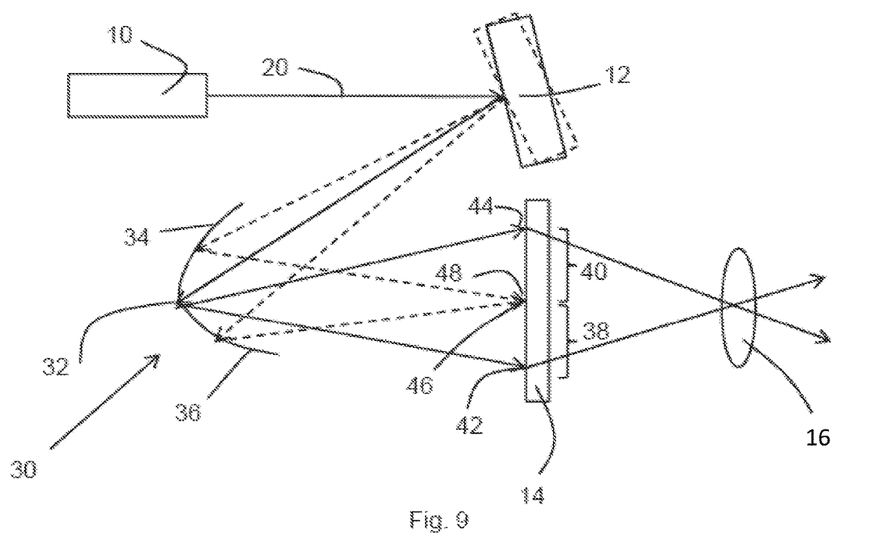
FIG. 9 shows an arrangement according to a third embodiment of the invention.

The sections need not be planar but may also be curved. FIG. 9 illustrates an arrangement in which the first and second sections 34,36 are curved.

These arrangements allow the pattern of light intensity to be adjusted as required to produce the desired light distribution.

Figure 10:
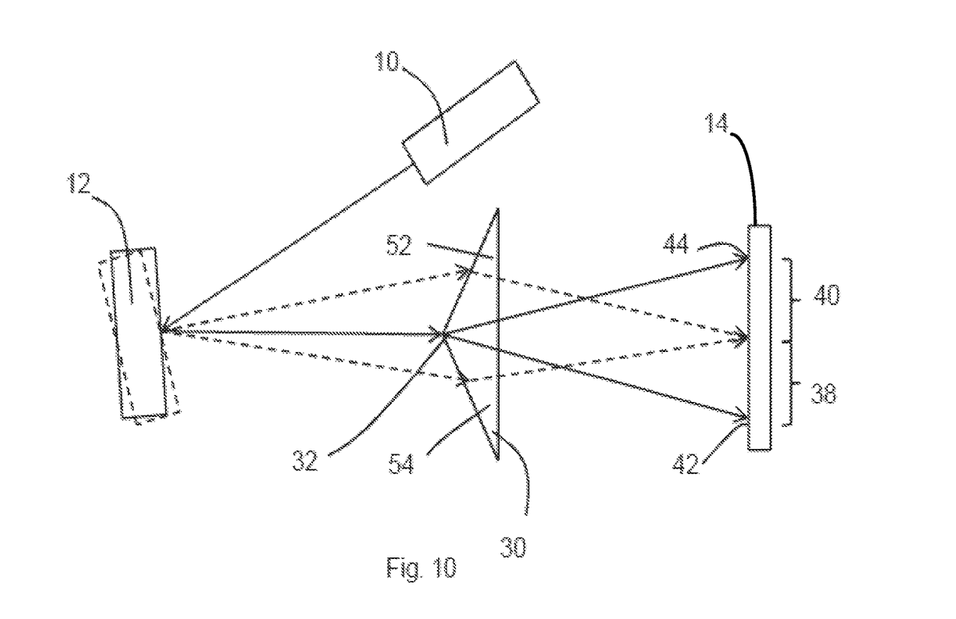
FIG. 10 shows an arrangement according to a fourth embodiment of the invention.

FIG. 10 illustrates a redirection element 30 in the form of a double prism with a first prism 52, a second prism 54 separated by a discontinuity 32. The prism results in a very similar intensity distribution to that illustrated in FIG. 7, for the same reasons—as the light beam crosses the discontinuity 32 it swings from the outer edge 42 of first region 38 to outer edge 44 of second region 40.

Figure 11:
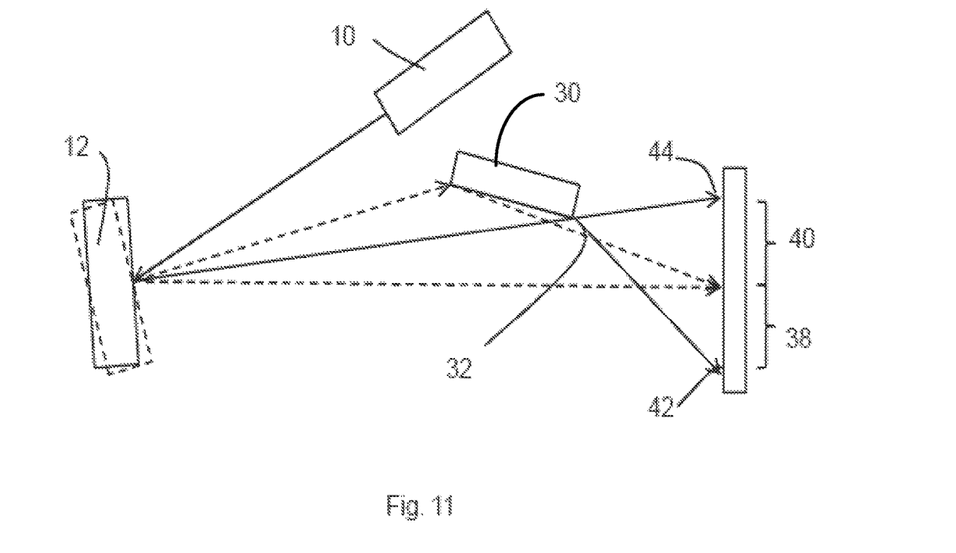
FIG. 11 shows an arrangement according to a fifth embodiment of the invention.
Figure 12:
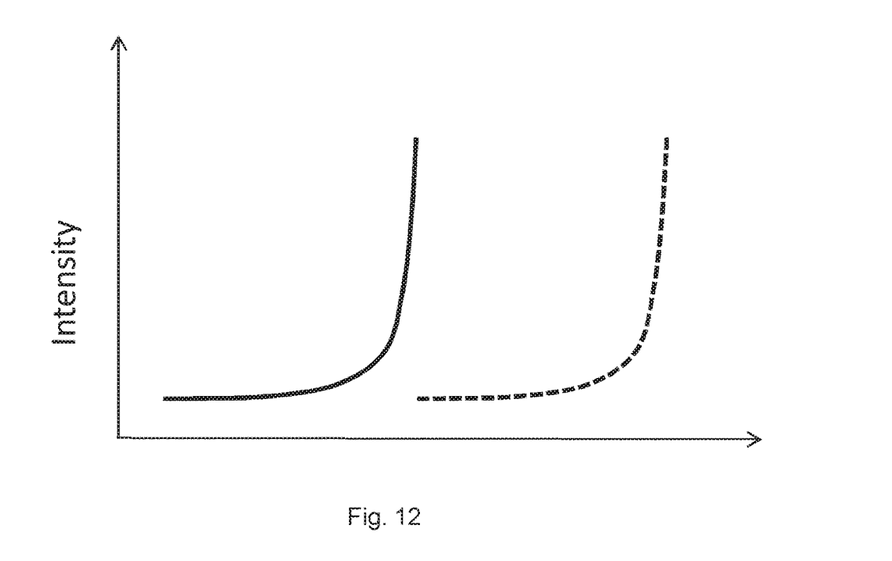
FIG. 12 shows an intensity profile resulting from the arrangement of FIG. 11.

FIG. 11 illustrates a further possibility with a redirection element 30 in the form of a mirror. In this instance, the discontinuity is at the edge of the mirror. This redirection element 30 also results in a very similar intensity distribution to that illustrated in FIG. 7. As the light beam crosses the discontinuity 32 at the edge of the redirection element 30 it swings from the outer edge 42 of first region 38 to outer edge 44 of second region 40. This may be considered to be a redirection element with one redirecting section (the mirror) and one non-redirecting section (empty space). This produces a different pattern at the converter element illustrated in FIG. 12.

Note that although FIGS. 10 and 11 do not show a lens 16, for clarity, a lens 16 may nevertheless be provided.

Figure 13:
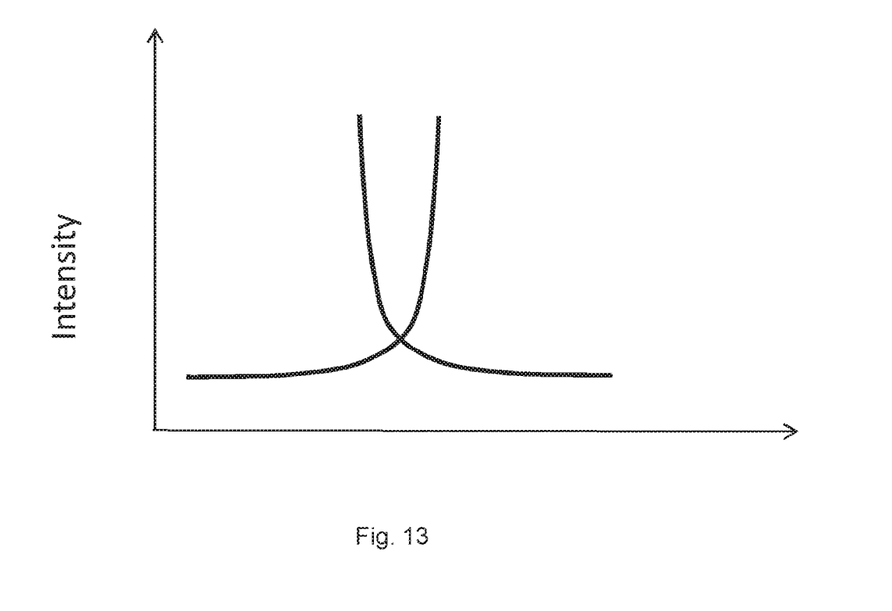
FIG. 13 shows an alternative intensity profile.

In alternative embodiments, the redirection element may be arranged such that the light distributions on the converter element from the sections of the redirection element overlap, as illustrated in FIG. 13. This means that there is no gap even if the redirection element is slightly misaligned. If necessary, the laser can be dimmed slightly in the overlap region to achieve the required distribution.

Those skilled in the art will realise that there are many variations.

The arrangement of FIG. 11 is an illustration of a redirection element that only redirects on one side of the discontinuity. The same approach may also be applied in other arrangements, for example a prism with two sections, one being a flat region and one being a redirecting region.

The above description describes the motion of the scanning element only in one dimension but in practice a two dimensional scan may be used. This may be achieved with a single mirror movable in two planes or alternatively two scanning mirrors.

The redirection element may include reflective elements or refractive elements such as prisms.

There may be more than two regions of the redirection element and hence more than two discontinuities. For example, the redirection element may be a prism with four facets or a reflector with four sections. It will be appreciated that the redirection element may be designed to generate a desired intensity pattern.

The mirrors or prisms may be flat or more complex shapes may be used if required. The shape may be free-form, spherical or piecewise planar.

The "discontinuity" need not be a completely sharp discontinuity, but should be a non-continuous function mapping the input micromirror position to the output representing the position across the phosphor. In the absence of a redirection element, this function would be a continuous straight line. With a lens, or other continuous element, this function would not be straight but still would be continuous. With the redirection element as here, the function has a discontinuity on a macroscopic scale.

In particular, the discontinuity 32 should be such that as the mirror 12 swings the light beam 20 across the discontinuity 32, the resulting spot of light moves rapidly across the conversion element, e.g. phosphor 14, with the total integrated light intensity of the spot of light as the light beam 20 crosses the discontinuity being small, preferably negligible, compared with the total integrated light intensity over time of the complete light distribution. This may be achieved if a small change in the rotation of mirror 12, for example no more than 2% or preferably 1% of the full amplitude of rotary motion, when moving the light beam 20 across the mirror, results in a large movement of the spot of light on the conversion element, for example at least 50% or preferably more than 90%, further preferably approximately 100%, of the full width of the light distribution 38, 40 on the conversion element.

As well as for automotive applications the invention can be used anywhere where a controllable light pattern is required, for example for laser based projection devices, for laser picoprojection, or for scanners.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting system comprising:
   a light source, for emitting first light;
   a wavelength converter element, configured to receive the first light and emit second light;
   an optical path between the light source and the wavelength converter element;
   a scanning system, arranged in the optical path and configured to direct the first light in a plurality of directions; and
   a redirection element, arranged in the optical path between the scanning system and the wavelength converter element, the redirection element having a discontinuity;
   wherein the redirection element is arranged to redirect the first light to spaced apart locations on the wavelength converter element from adjacent locations on either side of the discontinuity;
   wherein:
   the redirection element has a first section and a second section, the discontinuity being between the first and second sections;
   the first section is arranged to redirect first light onto a first portion of the wavelength converter element;
   the second section is arranged to redirect first light onto a different second portion of the wavelength converter element;
   the first and second portions of the wavelength converter element have adjacent inner edges;
   the first and second portions have outer edges opposite to the inner edges;
   the first and second sections of the redirection element have adjacent inner edges at the discontinuity; and
   the redirection element is arranged to direct light from at least one of the inner edges of the first and second sections of the redirection element to one of the outer edges of the first and second portions.

2. The lighting system according to claim 1, wherein the spaced apart locations on the wavelength converter element are spaced apart from each other by at least 50% of a full width of the first and second portions.

3. The lighting system according to claim 1, wherein the first and second portions overlap on the wavelength converter element.

4. The lighting system according to claim 1, wherein the redirection element is arranged to direct light from both inner edges of the first and second sections to the outer edges of the first and second portions.

5. The lighting system according to claim 1, wherein the redirection element is a reflector, having first and second sections having an angular discontinuity between the first and second sections.

6. The lighting system according to claim 5 wherein the first and second sections are planar.

7. The lighting system according to claim 1, wherein the redirection element is a prism, having first and second sections with the discontinuity between the first and second sections, wherein the prism is arranged to refract first light incident on the first section towards the first portion of the wavelength converter element and first light incident on the second section in a different direction towards the second portion of the wavelength converter element.

8. The lighting system according to claim 1, wherein the redirection element is a reflector having an edge, the edge constituting the discontinuity, wherein first light incident on the redirection element is redirected by the redirection element towards the first portion of the wavelength converter element, and first light incident on the other side of the discontinuity passes by the redirection element and is incident on the second portion of the wavelength converter element without redirection.

9. The lighting system according to claim 1, wherein the redirection element has at least three sections each directing the first light onto a respective portion of the wavelength converter element.

10. The lighting system according to claim 1, further comprising a controller, wherein the controller is arranged to drive the scanning system in a predetermined pattern repeating with a repetition rate of at least 100 Hz to generate a predetermined intensity profile at the wavelength converter element.

11. The lighting system according to claim 1, wherein the scanning system comprises a movable reflector.

12. The lighting system according to claim 11, wherein the movable reflector is a micromechanical system including a mirror.

13. The lighting system according to claim 1, further comprising a lens arranged to project light from the wavelength converter element.

14. The lighting system according to claim 1, wherein the light source is arranged to emit first light of a first color, and wherein the wavelength converter element is a phosphor adapted to pass some first light of the first color and to absorb some first light of the first color and emit the second light in a second color, wherein the first and the second colors combine to give white.

15. An automotive headlamp comprising a lighting system according to claim 1.

* * * * *